May 1, 1956 — E. SENEKER — 2,743,545
FISHING PLUG
Filed April 22, 1954 — 2 Sheets-Sheet 1
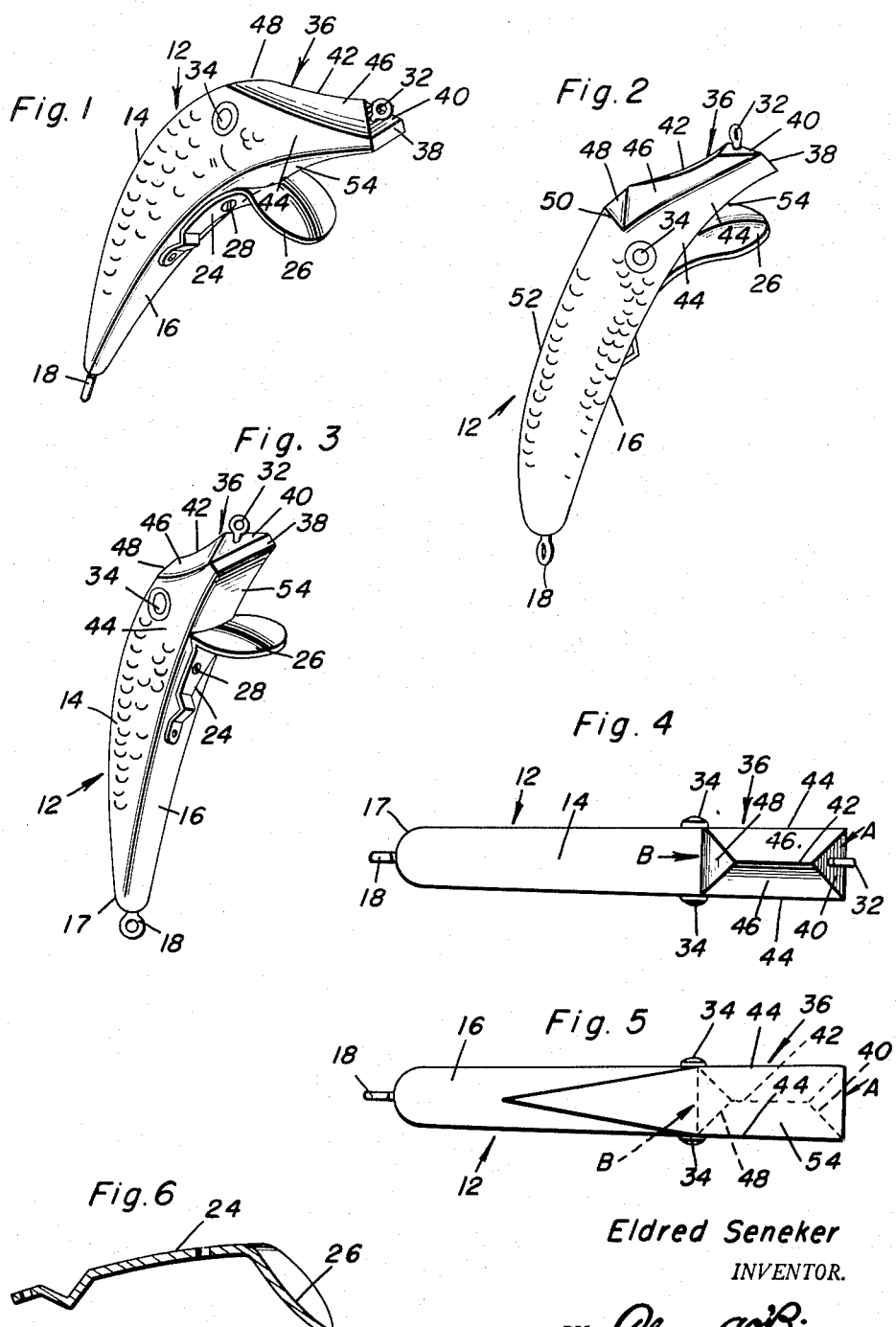
Eldred Seneker
INVENTOR.

May 1, 1956  E. SENEKER  2,743,545
FISHING PLUG
Filed April 22, 1954  2 Sheets-Sheet 2
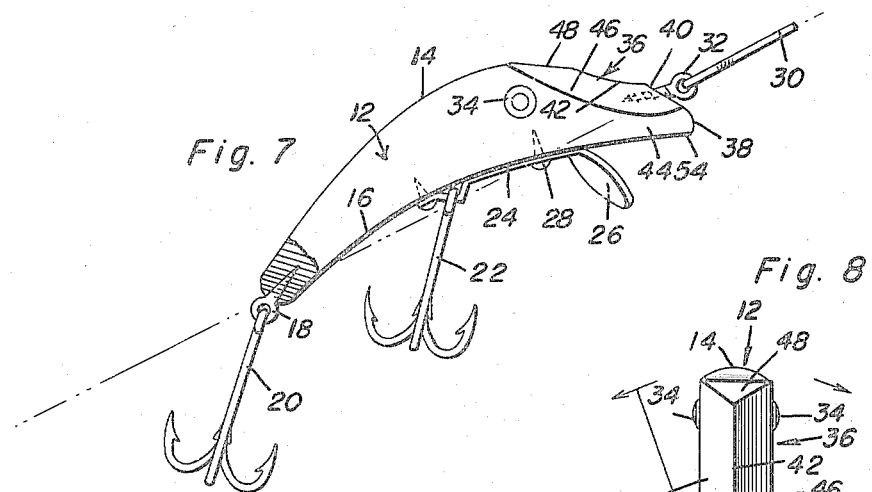
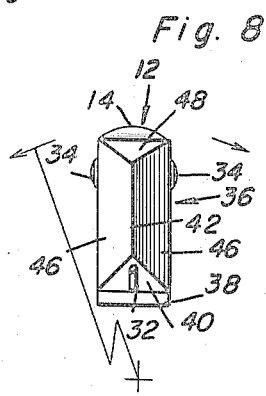
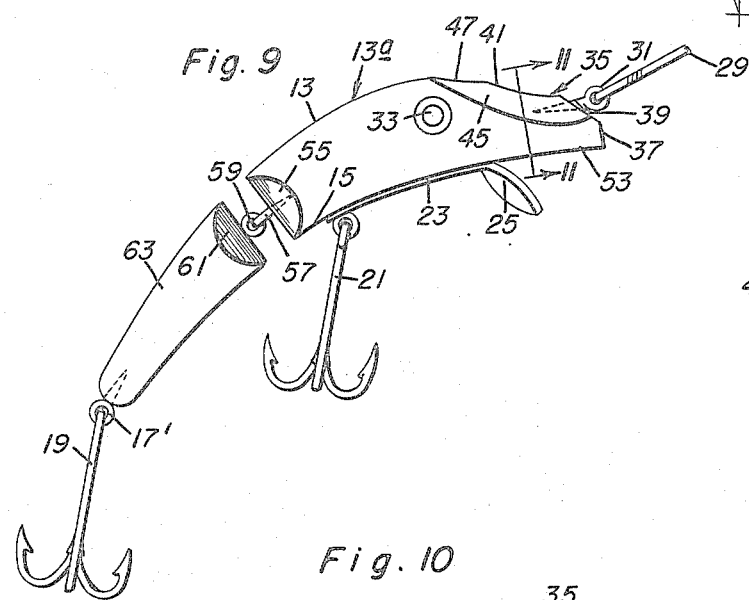
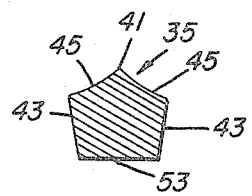
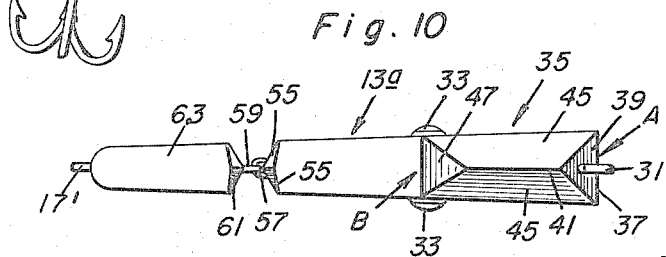
Eldred Seneker
INVENTOR.

United States Patent Office 2,743,545
Patented May 1, 1956

2,743,545

FISHING PLUG

Eldred Seneker, Mount Vernon, Mo.

Application April 22, 1954, Serial No. 424,823

1 Claim. (Cl. 43—42.48)

The present invention relates to certain new and useful improvements in artificial fishing bait and lures, having more particular reference to the type characterized by a buoyant plug which is shaped and contoured to represent a given creature, or in a manner to effectually catch fish.

Most plugs, whether straight or concavo-convex in design, taper from the top of the head to the tip of the tail and have little to do with animated movements of the plug. The heads of plugs vary in surface configuration and design, and it is the construction of the head, the point where the leader is attached to the head, and the scoops or wigglers which are attached to the head that, for the most part, cause the alluring movements of the plug when drawn through the water.

An object of the invention is to structurally, functionally and otherwise improve upon plug-type lures through the medium of a novelly designed construction which, when trolled or reeled through the water, has an attractive animated motion with the plug movable about an axis lengthwise of the over-all plug, and wherein the plug has a side-to-side or wig-wag motion with the head of the plug traveling the greatest distance from right to left on the stated axis.

Briefly summarized, the invention, in one of its aspects, has to do with a plug characterized by a body tapering rearwardly from the leading toward the trailing end and having a head of distinctive and unique surface configuration and construction, said head being oblong in both top and bottom plan, the forward transverse end of the nose portion having a flat blunt terminal tip which is rectangular in elevation, said top and nose portion being of a dimension equal to the cross-sectional dimension of the over-all head, the cross-section of the body portion being less than that of said head.

More specifically, novelty is predicated on the construction stated wherein the top of said head is of inverted V-shaped cross-section, providing a lengthwise ridge centered between the cheek-forming vertical sides of the head and the outwardly and downwardly sloping surfaces thereof merging into said vertical sides and converging with said ridge, said sloping surfaces being slightly recessed and thus concave, said nose being flat and triangular with its apex coincident with the adjacent end of the ridge, and the junctural crown of the head being likewise triangular with its apical end joining the adjacent end of said ridge and having its basal end merging into the dorsal surface of the body.

Objects and advantages in addition to those briefly touched upon above will become more readily apparent from the following description and the accompanying sheets of illustrative drawings.

In the drawings:

Figure 1 is a perspective view of a plug-type fishing lure or artificial bait constructed in accordance with the principles of the present invention;

Figure 2 is a perspective view taken from a different angle to bring out features not seen in Figure 1;

Figure 3 is a third perspective view wherein the underneath surfaces of the plug are presented;

Figure 4 is a top plan view;

Figure 5 is a bottom plan view;

Figure 6 is a sectional view of the type of spoon (scoop or wiggler) preferably used on the plug;

Figure 7 is a side elevational view;

Figure 8 is a front end elevation, observing the construction of Figure 7 in a direction from right to left, certain parts being omitted;

Figure 9 is also a side elevational view similar to Figure 7, but showing a modification in construction;

Figure 10 is a top plan view of the construction shown in Figure 9; and

Figure 11 is a cross-section on the vertical line 11—11 of Figure 9.

It is to be pointed out, by way of introduction to the detailed description, that the modification shown in Figures 9, 10 and 11 is characterized by a body portion which, for the most part, is possessed of the same structural characteristics, particularly the head construction, emphasized as the novelty in the form of the invention seen in Figures 1 to 5 and 7 and 8, inclusive. For this reason, these common characteristics will be referred to with the same reference numerals and accompanying lead lines. Figures 1 to 8 will be taken up first.

Referring now to the drawings with reference numerals and lead lines, the plug, which may be of wood, metal, commercial plastics or any suitable buoyant material construction, is longitudinally elongated and it is denoted generally by the numeral 12. The back or dorsal side is denoted at 14, and the belly or ventral side by the numeral 16. The body tapers rearwardly and is reduced in cross-section to provide a suitable trailing end 17 which, in practice, is provided with a screw eye 18 carrying an appropriately constructed fishhook 20. There is a second fishhook 22 on the underside, if desired. The hook 22 may be attached to the shank portion 24 of a water deflection spoon 26. The shank is attached by screws or the like 28. The fishing line is denoted at 30, and it is attached to a conventional line eye 32. The body may be of any suitable finish and appropriate shape, and provided with eyes 34. The parts so far set forth in the detailed description are more or less common. The invention has to do with the distinctive and unique head, that is, the head 36, this being of novel surface configuration and construction. It will be seen that the head is oblong in both top and bottom plan, that the forward transverse end 38 of the nose portion 40 is rectangular in elevation, that said tip and nose portions are of a dimension equal to the cross-sectional dimension of the over-all head. The cross-section of the body or body portion 12 is less than that of the head. The top of the stated head is of inverted V-shaped cross-section (Figure 11) and thus provides a lengthwise ridge 42 which is centered between the cheek-forming vertical sides 44 providing outwardly and downwardly sloping surfaces 46—46 merging into the vertical sides and converging with said ridge 42. These sloping surfaces are slightly recessed and are thus concave. The nose portion 40 is triangular, with its apex coincident with the adjacent end of the ridge 42, and the junctional crown 48 of the head is likewise triangular and its apical end joins the adjacent end of the ridge 42 whereas the basal end 50 merges into the dorsal surface 52 of the body. It will be noted that the ridge is arcuate in side elevation, and is thus concave in a lengthwise direction. The bottom, the throat portion, of the head is rectilinear in transverse section, said throat being denoted generally by the numeral 54. This throat is also transversely flat, arcuate in side elevation, and concave in a lengthwise direction. The radius of the arc which defines the concavity of the ridge 42 differs from the radius of the arc which defines and determines the degree of concavity of the bottom 54. This means that the crest of the first named arc 42 is disposed downwardly, while the crest of the second named arc, that is, the arc of the surface 54, is disposed upwardly. Hence, these concavities may be said to be in reverse relationship.

The peculiarly unique design of the head of the plug with its two concave surfaces provides the minimum amount of water resistance to the plug when it is moving back and forth in the water, thus enabling the plug to wig-wag more freely. The side-to-side movement of the plug does not so much resemble the mannerisms and movements of an active live minnow in the act of swimming, but resembles a wounded minnow struggling in the water and which while so struggling sends out numerous waves from left to right and right to left. This results in such a commotion in the water as to be very attractive to a fish.

This flatness and width permit the attachment of any one of a various number of commercial scoops or wigglers; small, medium, large, light or heavy, on the underside of the head at any point from A to B, thus providing a plug that can be used as a top water plug or a medium or deep running plug.

With a light scoop 26 attached at or near point A on the plug, the plug, when given a sudden pull in the water, will produce a popping sound and, at the same time, sends myriads of bubbles to the surface of the water. This popping sound, the bubbles forming, and the wig-wag motion of the plug gives one a plug with enticing movements in the water and at the same time sets up a stream of "waves" flowing from each side of the plug when in motion.

With reference now to the modification disclosed in Figs. 9, 10 and 11 the body portion as denoted at 13a is to be considered in conjunction with the already described body 14 and the head features are denoted by similar numerals. More specifically the back or dorsal side is denoted at 13 and the belly or ventral side by the numeral 15. The body tapers rearwardly and is reduced in cross-section to provide a suitable trailing end which, in practice, is provided with an eye screw 57 which accommodates a cooperating eye screw 59 which is joined thereto and carried by the cooperating end portion 61 of the complemental body 63. At the trailing end of this there is an eye screw 17' which serves to supportingly accommodate a fish hook 19. The other fish hook 21 is connected by an appropriate eye screw to the ventral side 15 as shown. The water deflecting spoon 25 of any suitable construction is preferably provided with a shank 23 attached by screws or the like to the ventral side. The fishing line is denoted at 29 and it is attached to the conventional line eye 31. The body may be of any suitable finish and appropriate shape and it is provided with imitation eyes 33. The invention has to do, as already pointed out, with a distinctive and unique head, that is the head 35, this being of novel surface configuration and construction. It will be seen that the head is oblong in both top and bottom plan and that the forward transverse end 37 of the nose portion 39 is rectangular in cross-section, that said tip and nose portions are of a dimension equal to the cross-sectional dimension of the overall head. The cross-section of the body portion is less than that of the head. The top of the stated head is of inverted V-shape cross-section (Fig. 11) and thus provides a lengthwise ridge 41 which is centered between the cheek-forming substantially vertical sides 43 providing outwardly and downwardly sloping surfaces 45 merging into such substantially vertical sides and converging with the ridge 41. These sloping surfaces are slightly recessed and are thus concaved. The nose portion 39 is triangular with its apex coincident with the adjacent end of the the ridge 41 and the junctional crown 47 of the head is likewise triangular and its apical end joins the adjacent end of the ridge 42. The throat portion of the head is rectilinear in transverse section and is denoted generally by the numeral 53. The radius of the arc which defines the concavity of the ridge 41 differs from the radius of the arc, which defines and determines the degree of concavity of the bottom 53.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An artificial fish attracting and catching bait comprising a plug characterized by a body tapering rearwardly from the leading toward the trailing end and having a head of distinctive and unique surface configuration and construction, said head being oblong in both top and bottom plan and provided with a nose portion, the forward transverse end of the nose portion having a flat blunt terminal tip which is rectangular in elevation, said top and nose portion being of a width equal to the cross-section of the over-all head, the cross-section of the body portion being less than that of said head, the top of said head being of inverted V-shaped cross-section and providing a central lengthwise ridge and cheek-forming substantially vertical sides and the outwardly sloping surfaces thereof merging into said vertical sides and converging with said ridge, said sloping surfaces being slightly recessed and thus concave, said nose portion being flat and triangular in rear of said tip with its apex coincident with the adjacent end of the ridge, and the rear portion of the top of the head constituting a junctional crown and being likewise triangular with its apical end joining the adjacent end of said ridge and having its basal end merging into the dorsal surface of the body, said ridge being arcuate in side elevation and thus concave lengthwise, the bottom of said head being arcuate in side elevation, uninterruptedly smooth and concave in a lengthwise direction, the radius of the arc which defines the concavity of the ridge differing from the radius of the arc which defines and determines the degree of concavity of said bottom, the crest of the first named arc curving and being disposed downwardly and the crest of the second named arc curving and being disposed upwardly.

References Cited in the file of this patent
UNITED STATES PATENTS

| | | |
|---|---|---|
| 1,246,162 | Ross | Nov. 13, 1917 |
| 1,599,763 | Head | Sept. 14, 1926 |
| 1,791,316 | Jordan | Feb. 3, 1931 |
| 2,159,591 | Leusch et al. | May 23, 1939 |
| 2,305,865 | Goyings | Dec. 22, 1942 |
| 2,641,862 | Poe | June 6, 1953 |